United States Patent [19]
Irwin

[11] 3,801,260
[45] Apr. 2, 1974

[54] IGNITER
[76] Inventor: Michael G. Irwin, 1919 Vuelta Grande Ave., Long Beach, Calif. 90815
[22] Filed: Feb. 22, 1973
[21] Appl. No.: 334,771

[52] U.S. Cl. ............................... 431/128, 431/256
[51] Int. Cl. ............................................. F23q 3/00
[58] Field of Search ............ 431/72, 255, 256, 344, 431/127, 128

[56] References Cited
UNITED STATES PATENTS
1,915,446 6/1933 Pressler .............................. 431/128
3,403,964 10/1968 Delbourgo et al. ................. 431/256

Primary Examiner—Edward G. Favors
Attorney, Agent, or Firm—Bruce D. Jimerson

[57] ABSTRACT

The specification discloses an electrical igniter for gas operated devices and more particularly an arrangement for automatically lighting a welding torch.

3 Claims, 5 Drawing Figures

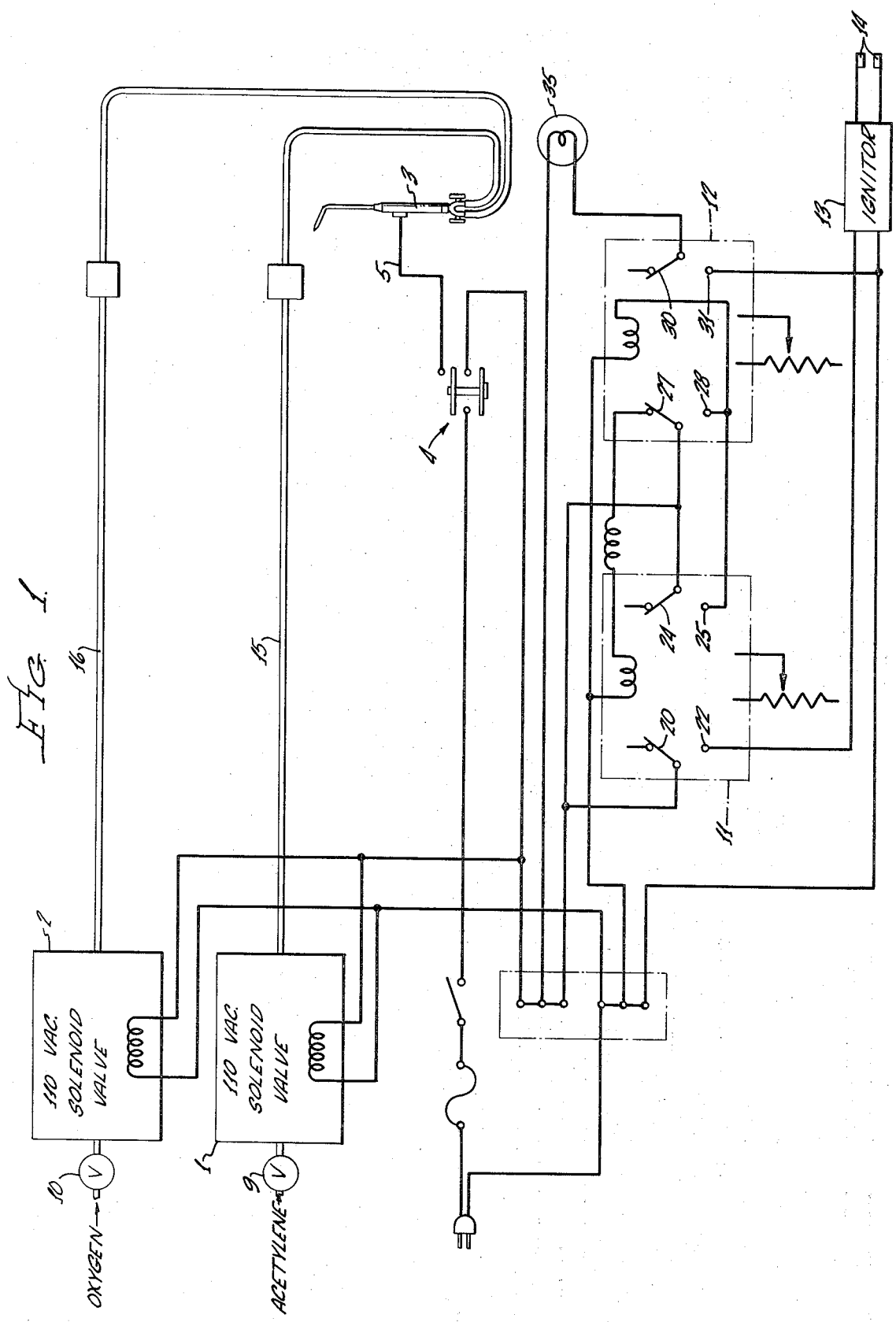

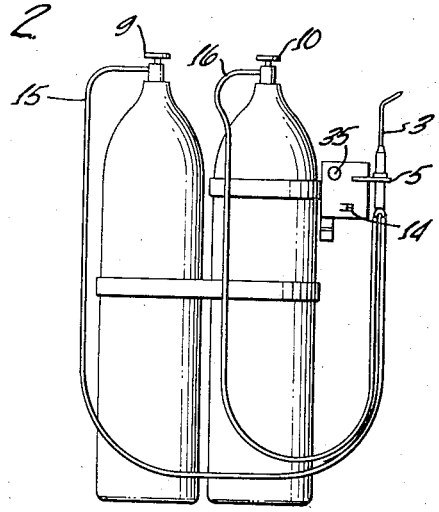
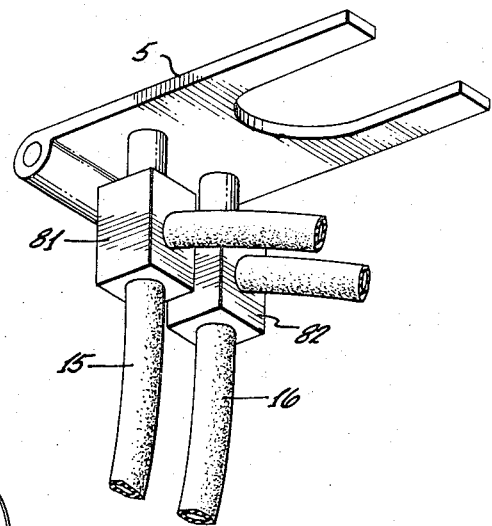
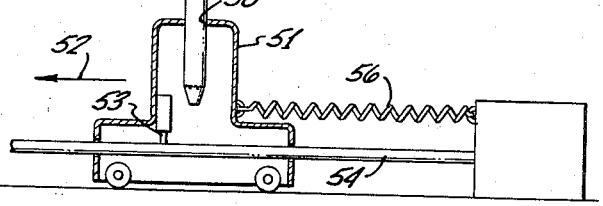
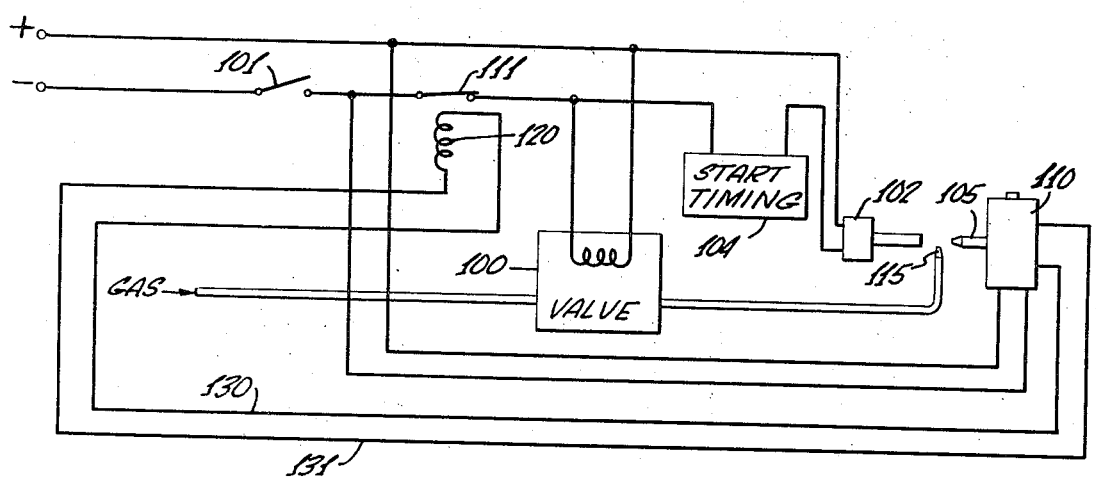

IGNITER

BACKGROUND OF THE INVENTION

Most conventional gas appliances utilize some sort of gas pilot arrangement to reignite a main flame from time to time as required. In household appliances employing pilot flames, there is usually some provision for automatically shutting off the gas to the pilot circuit if the pilot is extinguished. This automatic shut-off is usually accomplished by a thermocouple which generates an electrical voltage to maintain the pilot safety valve open as long as the presence of the small pilot flame is detected. While the pilot light approach is adequate for many applications, it has some disadvantages in others. In the field of gas welding for example, the continuous use of the bottled gas to maintain the pilot is expensive. Such portable systems rarely incorporate the safety pilot feature, and there is a fairly high probability that the user may loose all of his gas by inadvertently forgetting to shut down the pilot valve. Even with ordinary household appliances, such as stoves and furnaces, the pilot light produces unwanted heating in the summer. The thermocouples are subject to intense heat, and must frequently be replaced.

One approach (sometimes employed on gas dryers) uses a pair of vibrating electrical contacts. The spark produced by the making and breaking of the points causes the gas to ignite. A thermocouple is typically used to provide a signal to shut off the vibrating points after the gas flame is detected. Such systems do not automatically shut down if there is a gas failure. What is actually desired is an electrical igniter which can be adapted for use on portable welding apparatus or as a replacement for gas operated home appliances.

Accordingly, a primary object of the present invention is to provide an apparatus for reigniting a gas operated apparatus.

Another object of the present invention is to provide an electrical igniter for a welding torch.

A further object of the present invention is to provide apparatus for automatically opening the gas and oxygen valves immediately prior to activating an electrical igniter.

Another object of the invention is to provide an apparatus for automatically terminating the ignition phase after a predetermined time or after the happening of a predetermined event.

Another object of the invention is to provide an electronic detector for determining whether or not a gas flame has been estinguished.

Other objects and advantages of the present invention will be obvious from the detailed description of a preferred embodiment given herein below.

SUMMARY OF THE INVENTION

The aforementioned objects are realized by the present invention which comprises a pair of spark producing points which are actuated and shut off by an electronic timer. A paramount application of the apparatus is to light a gas welding torch. The timing cycle is started one or two seconds after the torch is lifted from its hanger, and terminated after four or 5 seconds whether or not the torch has ignited. Additionally, the acetylene and oxygen valves are opened at the time the torch is lifted, and shut off when the torch is returned to its hanger. Other applications include a pilot light for household appliances in which case a photo or heat sensitive semi-conductor can be used to provide feedback as to whether the flame is on or extinguished.

DESCRIPTION OF THE DRAWINGS

FIG. 1 is a schematic diagram showing the operative elements of a preferred embodiment of an automatic gas welding igniter.

FIG. 2 is a perspective view showing how the igniter would appear when attached to a conventional welding rig.

FIGS. 3a and 3b show a totally mechanical arrangement to effect the valve and ignition functions respectively.

FIG. 4 is a block diagram of an alternative embodiment adopted for use in household appliances normally requiring a continuous pilot light.

DESCRIPTION OF A PREFERRED EMBODIMENT

Adverting to the drawings and particularly FIG. 1, a preferred embodiment of the invention comprises a pair of electrically operated solenoid valves 1 and 2 which are activated to the "open valve" position via switch 4 when the weight of welding torch 3 is removed from hanger arm 5. Valve 1 is connected to the acetylene supply and valve 2 is connected to the oxygen supply — each of which has been previously adjusted via throttle valves 9 and 10 to supply the proper ratio of oxygen and acetylene respectively. Switch 4 also supplies power to the adjustable time delay relays 11 and 12 which function to actuate igniter 13 in a manner to be described below. Igniter 13 includes a pair of electrical contacts 14 which are caused to vibrate at 60 cps during a time period determined by the adjustment of relays 11 and 12. The vibrating contacts are impressed with a voltage which causes an electrical spark each time the points open and close. It is this spark which is used to ignite the torch.

FIG. 2 shows how the igniter would appear when attached to a conventional welding rig. Torch 3 normally rests in hanger 5, its weight being sufficient to actuate switch 4 to the open position. When the user wishes to ignite the torch he removes it from its hanger and holds it approximately two inches from contacts 14. The removal of the torch from its hanger causes switch 4 to close. The closure of switch 4 causes solenoid valves 1 and 2 to open, and applies power to time delay relays 11 and 12. Relay 11 is adjusted to provide an initial delay of approximately 1 or 2 seconds to allow the acetylene and oxygen to reach the torch 3 via lines 15 and 16 respectively. After this interval, relay 11 changes state (contacts 20 and 24 make contact with 22 and 25 respectively) so as to apply power to igniter 13 and relay 12. Time delay relay 12 is adjusted to provide a 3 to 5 second delay in order to allow sufficient time to ignite torch 3. After this interval, relay 12 changes state (contacts 27 and 30 make contact with 28 and 31 respectively) so as to actuate indicator lamp 35 and return time delay relay 11 to its original state (thus interrupting the application of power to igniter 13). If, for some reason, torch 3 fails to ignite, the cycle can be restarted by momentarily depressing arm 5, (which interrupts power from relay 12 causing it also to return to its original state).

With regard to the embodiment shown in FIGS. 1 and 2, it will be evident that numerous other elements may be arranged to effectuate the same results. For example, the solenoid valves 1 and 2 could be replaced by weight actuated valves as shown in FIG. 3a. The AC supply could be replaced by a portable rechargeable battery. Time delay relays 11 and 12 could be replaced by electrical time delays such as one shots or other R.C. time constant circuits. In fact, it is contemplated that the functions performed by relays 11 and 12 would be replaced by circuitry incorporated in a single chip. The striker itself could be replaced by a mechanical spark producing apparatus such as a spring returned flint striker. Such an arrangement is shown in FIG. 3b. In this totally mechanical embodiment, illustrated in FIGS. 3a and 3b, the acetylene and oxygen valves 81 and 82 are opened mechanically (by removing the weight of the torch) and the torch is ignited by placing the tip into the accordant recess 50 of slider 51 and pulling downward in the direction of arrow 52. Flint 53 rubs against the serrated surface of the steel sheet 54 producing a spark. After the torch is removed, the slider is returned to its original position by spring 56.

Referring now to FIG. 4, an alternative embodiment of the invention for use in connection with various gas operated household appliances, comprises a main line valve 100 which is actuated to the open position via switch 101; a vibrating contact igniter 102, which is actuated by timing circuits 104 (which function in a similar manner to the time delay relays 11 and 12 (shown in FIG. 1), a sensor 105 for detecting whether the burner has lighted, and a disable timing circuit 110 which interrupts the AC via normally open safety switch 111 if ignition fails to take place within a specified time interval. The circuit functions as follows: Upon closing switch 101, main gas valve 100 is opened to allow gas to escape through burner orfice 115. Timing circuits 104 actuate igniter 102 for an interval sufficient to assure ignition of the burner. At the time switch 101 is closed, safety switch 111 also closes as a consequence of power applied to the coil 120 via timing circuit 110 which is started in operation when switch 101 is closed. Sensor 105, which is preferrably a heat sensing thermister or photo diode, provides a continuous signal after the burner lights. If for some reason the burner fails to light within a specified time (determined by timing circuit 110) or if the flame is somehow extinguished, timer 110 cuts off power to lines 130 and 131 causing safety switch 11 to open. When safety switch 111 opens, power is removed from valve 100, causing it to close. Timing circuit 110 must then be manually reset before reignition is attempted.

The basic concepts illustrated herein are of course not limited to welding apparatus, or, any particular gas appliance. Nor are the various embodiments intended as being exhaustive of the various modifications possible. Thus, although preferred embodiments have been shown and described, it will be understood that the invention is not limited thereto and that numerous changes, modifications and substitutions may be made without departing from the spirit of the invention.

I claim:

1. An Igniter comprising:
    a gas outlet orifice comprising the tip of a welding torch;
    conduit means connecting said orfice with a supply of combustable gas;
    a valve for closing said conduit means;
    means for automatically opening said valve, said means comprising:
    a hanger for supporting said torch;
    an electrical switch responsively connected to said hanger to provide a signal when said torch is removed from said hanger;
    solenoid means responsively connected to said switch for actuating said valve to the open position when a signal is provided by said switch;
    means for producing a spark adjacent to said gas orfice.

2. An Igniter comprising:
    a gas outlet orfice comprising the tip of a welding torch;
    conduit means connecting said orfice with a supply of combustable gas;
    a valve for closing said conduit means;
    means for automatically opening said valve;
    means for producing a spark adjacent to said gas orfice, said means comprising;
    a pair of vibrating electrical contacts;
    automatic means for actuating said contacts after said valve is opened;
    automatic means for deactuating said contacts after a predetermined period.

3. An Igniter comprising:
    a gas outlet orfice comprising the tip of a welding torch;
    conduit means connecting said orfice with a supply of combustable gas;
    a valve for closing said conduit means;
    means for automatically opening said valve;
    means for producing a spark adjacent to said gas orfice, said means comprising;
    a pair of vibrating electrical contacts;
    means for actuating said contacts at a predetermined time after said valve is opened;
    means for deactuating said contacts at a predetermined time after said contacts are actuated.

* * * * *